United States Patent
Liu et al.

(10) Patent No.: US 12,283,708 B2
(45) Date of Patent: *Apr. 22, 2025

(54) TERMINAL PROTECTION DEVICE AND BATTERY MODULE

(71) Applicant: Contemporary Amperex Technology Co., Limited, Ningde (CN)

(72) Inventors: Daohui Liu, Ningde (CN); Jihua Yao, Ningde (CN); Yangzhi Huang, Ningde (CN); Shengtian Cai, Ningde (CN); Sheng Shen, Ningde (CN); Haidong Zhang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,658

(22) Filed: Jun. 16, 2023

(65) Prior Publication Data

US 2024/0039110 A1    Feb. 1, 2024

Related U.S. Application Data

(63) Continuation of application No. 17/539,224, filed on Dec. 1, 2021, now Pat. No. 11,721,871, which is a
(Continued)

(30) Foreign Application Priority Data

Jun. 3, 2019    (CN) .......................... 201920823079.6

(51) Int. Cl.
*H01M 50/296*    (2021.01)
*H01M 50/209*    (2021.01)

(52) U.S. Cl.
CPC ....... *H01M 50/296* (2021.01); *H01M 50/209* (2021.01)

(58) Field of Classification Search
CPC ............. H01M 50/296; H01M 50/209; H01M 50/204; Y02E 60/10
See application file for complete search history.

(56) References Cited

U.S. PATENT DOCUMENTS

4,562,125 A * 12/1985 Davis .................. H01M 50/571
                                                                     180/68.5
5,643,693 A * 7/1997 Hill ..................... H01M 50/296
                                                                      429/123
(Continued)

*Primary Examiner* — Michael L Dignan
(74) *Attorney, Agent, or Firm* — East IP P.C.

(57) ABSTRACT

Provided are a terminal protection device and a battery module. The terminal protection device includes a base having a bottom portion and side plates connected to peripheral sides of the bottom portion, the side plates and the bottom portion together form an accommodation cavity, and an input port is in communication with the accommodation cavity; each of the side plates is provided with an input port, through which an output electrode passes; each of the side plates is further provided with a connection port, the connection port is in communication with the accommodation cavity such that an external electric connector can pass through the connection port) and be connected to the output electrode; and a protection plate is provided at the connection port, and the protection plate detachably covers the connection port.

20 Claims, 10 Drawing Sheets

Related U.S. Application Data continuation of application No. PCT/CN2020/084341, filed on Apr. 11, 2020.

(56) References Cited

U.S. PATENT DOCUMENTS

| | | | | |
|---|---|---|---|---|
| 6,828,058 B2 * | 12/2004 | Ohtsuka | ............... | H01R 11/284 |
| | | | | 439/522 |
| 9,142,828 B2 * | 9/2015 | Matsumoto | ......... | B60R 16/0238 |
| 11,721,871 B2 * | 8/2023 | Liu | .................... | H01M 50/204 |
| | | | | 429/179 |
| 2019/0027731 A1 * | 1/2019 | Zeng | .................... | H01M 50/51 |
| 2019/0081311 A1 * | 3/2019 | Zeng | .................... | H01R 12/774 |
| 2019/0237718 A1 * | 8/2019 | Ohshiba | ............... | H01M 50/358 |

* cited by examiner

TERMINAL PROTECTION DEVICE AND BATTERY MODULE

CROSS REFERENCES TO RELATED APPLICATIONS

The present application is a continuation of U.S. application Ser. No. 17/539,224, filed on Dec. 1, 2021, which is a continuation of International Application No. PCT/CN2020/084341, filed on Apr. 11, 2020. The International application claims priority to Chinese Patent Application No. 201920823079.6, filed on Jun. 3, 2019. The aforementioned patent applications are hereby incorporated by reference in their entireties.

TECHNICAL FIELD

The present application relates to the technical field of energy storage equipment, and particularly to a terminal protection device and a battery module.

BACKGROUND

The module output terminal of the battery module has various structures in the prior art. Since the connection between the battery modules is realized through the module output terminals, the module output terminals are provided with open connecting ports. However, during transportation of the battery modules, that is, before the battery modules are connected to each other, the open connecting ports may cause short-circuit of the modules, electric shocks of the operators, and other accidents.

Therefore, there is an urgent need for a new terminal protection device and battery module.

SUMMARY

The embodiments of the present disclosure provide a terminal protection device and a battery module, which aim to improve the safety performance of the battery module during the transportation.

One aspect of the embodiments of the present disclosure provides a terminal protection device for a battery module, the terminal protection device including: a base, including a bottom portion and a side plate connected to a peripheral side of the bottom portion, the side plate defining a receiving cavity together with the bottom portion and being provided with an input port through which an output terminal passes, and the input port being in communication with the receiving cavity, wherein the side plate is provided with an access port, the access port is in communication with the receiving cavity so that an external electrical connector is able to pass through the access port and be connected with the output terminal, a protection plate is disposed at the access port, and the protection plate is disposed to detachably cover the access port.

According to one aspect of the present disclosure, the side plate is provided with at least two access ports spaced apart in a circumferential direction of the side plate, and each of the access ports is provided with a corresponding protection plate therein.

According to one aspect of the present disclosure, the receiving cavity includes an opening disposed oppositely to the bottom portion, the opening is in communication with the access port and is covered by a top cover, and the top cover is detachably disposed at the opening so as to limit the protection plate at the access port.

According to one aspect of the present disclosure, the side plate further includes a connection port spaced apart from the access port in the circumferential direction of the side plate;

the top cover includes a cover plate and a shielding plate extending out from the cover plate, the cover plate covers the opening and the shielding plate shields the connection port correspondingly; and the shielding plate is provided with a notch extending in a second direction, so that at least a part of the shielding plate on a side of the notch away from the cover plate can be removed by means of the notch, and the external electrical connector can pass through the connection port and be connected with the output terminal.

According to one aspect of the present disclosure, the shielding plate includes a removable portion, a connecting portion and a corner portion connecting the removable portion and the connecting portion, the removable portion, the corner portion and the connecting portion are successively distributed in a third direction, the removable portion is located at the side of the notch away from the cover plate, the connecting portion is located between the notch and the cover plate, and the third direction intersects with the second direction; and the corner portion has a cross section with a dimension decreasing in a direction from the removable portion to the connecting portion.

According to one aspect of the present disclosure, one of the top cover and the side plate is provided with a first snap member, and the other is provided with a second snap member, the second snap member is fitted with the first snap member so that the top cover and the side plate is connected to each other in a snap fit manner by means of the first snap member and the second snap member.

According to one aspect of the present disclosure, the first snap member is formed as a groove, and the second snap member is formed as a protrusion; the second snap member includes two protrusions spaced apart in the third direction, one of the two protrusions is snapped into the groove, and the other one is stopped on a top of the side plate or a top of the top cover.

According to one aspect of the present disclosure, the cover plate includes a flat portion and a resilient portion connected to each other in the first direction, the resilient portion is U-shaped, and includes two side arms spaced apart in the first direction, and a bottom arm connected between the side arms.

According to one aspect of the present disclosure, the side plate includes sliding slots extending in a third direction on inner surfaces facing the access port; and the protection plate includes a body portion and sliding plates located on two opposite edges of the body portion, and the sliding plates are movable relative to the sliding slots, so that the protection plate is detachably disposed in the sliding slots through the sliding plates.

According to one aspect of the present disclosure, the sliding plates each includes two ends opposite to each other in the third direction and a middle portion located between the two ends, and has a dimension in a first direction increasing from at least one of the ends to the middle portion.

According to one aspect of the present disclosure, the bottom portion is formed as extending in a third direction, and the bottom portion is provided with a boss on at least one side in a second direction, so that the terminal protection device is snapped into an end plate of the battery module through the boss.

A further aspect of the embodiments of the present disclosure provides a battery module, including: multiple unit cells, stacked in a first direction; an output terminal, electrically connected to the unit cells; an end plate, disposed on one side of the multiple unit cells in the first direction and provided with a groove, the groove corresponding to the output terminal in position; and the above-mentioned terminal protection device snapped into the groove, and at least part of the output terminal extending into the receiving cavity of the terminal protection deceive through the input port.

In the present disclosure, the side plate of the terminal protection device is provided with the input port, so that the output terminal can extend into the receiving cavity through the input port. The side plate is further provided with the access port, the protection plate is disposed at the access port, and the protection plate is disposed to detachably cover the access port. When the terminal protection device is applied to the battery module, during the transportation of the battery module, the protection plate can be disposed to cover the access port, thereby preventing the electric leakage caused by the electrical connection between the output terminal in the receiving cavity and the external device, and improving the safety performance of the battery module during the transportation. Moreover, the protection plate is detachably disposed at the access port, and the removal of the protection plate will not structurally damage other portions of the terminal protection device, which can improve the service life of the terminal protection device, prevent the exposure of the electric portions of the output terminal or of the electrical connector caused by the damage of the terminal protection device, and thus further improve the safety performance of the battery module.

BRIEF DESCRIPTION OF THE DRAWINGS

By reading the following detailed description of the non-limiting embodiments with reference to the accompanying drawings, other features, purposes and advantages of the present application will become more apparent, wherein the same or similar reference signs refer to the same or similar features.

DESCRIPTION OF REFERENCE SIGNS 10 terminal protection device;
100, base; 110, bottom portion; 111, boss; 112, conductive fastener; 120, side plate; 121, input port; 122, access port; 123, connection port; 124, groove; 125, sliding slot; 130, receiving cavity; 131, opening; 140, protection plate; 141, body portion; 142, sliding plate; 142a, guide surface;
200, top cover; 210, cover plate; 211, flat portion; 212, resilient portion; 212a, side arm; 212b, bottom arm; 220, shielding plate; 221, removable portion; 222, connecting portion; 223, corner portion; 230, notch; 240, protrusion;
20, unit cell;
30, upper cover;
40, end plate; 41, groove;
60, output terminal; 61, through hole;
50, electrical connector;
X, first direction;
Y, second direction;
Z, third direction.

DETAILED DESCRIPTION

The features and exemplary embodiments in various aspects of the present application will be described in detail below. In the following detailed description, many specific details are proposed in order to provide a comprehensive understanding of the present application. However, it is obvious to the person skilled in the art that the present application can be implemented without some of these specific details. The following description of the embodiments is only to provide a better understanding of the present application by showing examples of the present application. In the drawings and the following description, at least part of the well-known structures and technologies are not shown in order to avoid unnecessary blurring of the present application; and, for clarity, the size of some structures may be exaggerated. In addition, the features, structures or characteristics described below may be combined in one or more embodiments in any suitable manner.

In the description of the present disclosure, it should be noted that, unless otherwise stated, the meaning of "a plurality" is two or more; the orientations or positional relationships indicated by the terms "upper", "lower", "left", "right", "inner", "outer" and the like are merely for the purpose of describing the present disclosure and simplifying the description, and are not intended to indicate or imply that the device or component referred to has a particular orientation, is constructed and operated in a particular orientation, and therefore cannot be understood to be a limitation of the present disclosure. Moreover, the terms "first", "second", and the like are used for descriptive purposes only and are not to be construed as indicating or implying relative importance.

The orientations appearing in the following description are all directions shown in the accompanying drawings and are not intended to limit the specific configuration of the present disclosure. In the description of the present disclosure, it should be noted that, unless otherwise specified and stated clearly, the terms "install", "connect", and "couple" are to be understood broadly, and may be, for example, a fixed connection, a disassemble connection, or an integral connection, and may be a direct connection or an indirect connection via an intermediate medium. The specific meaning of the above terms in the present disclosure can be understood by the person skilled in the art according to actual circumstance.

In order to better understand the present application, the terminal protection device and the battery module according to the embodiments of the present application will be described in detail below with reference to FIGS. 1 to 14.

Figure 1:
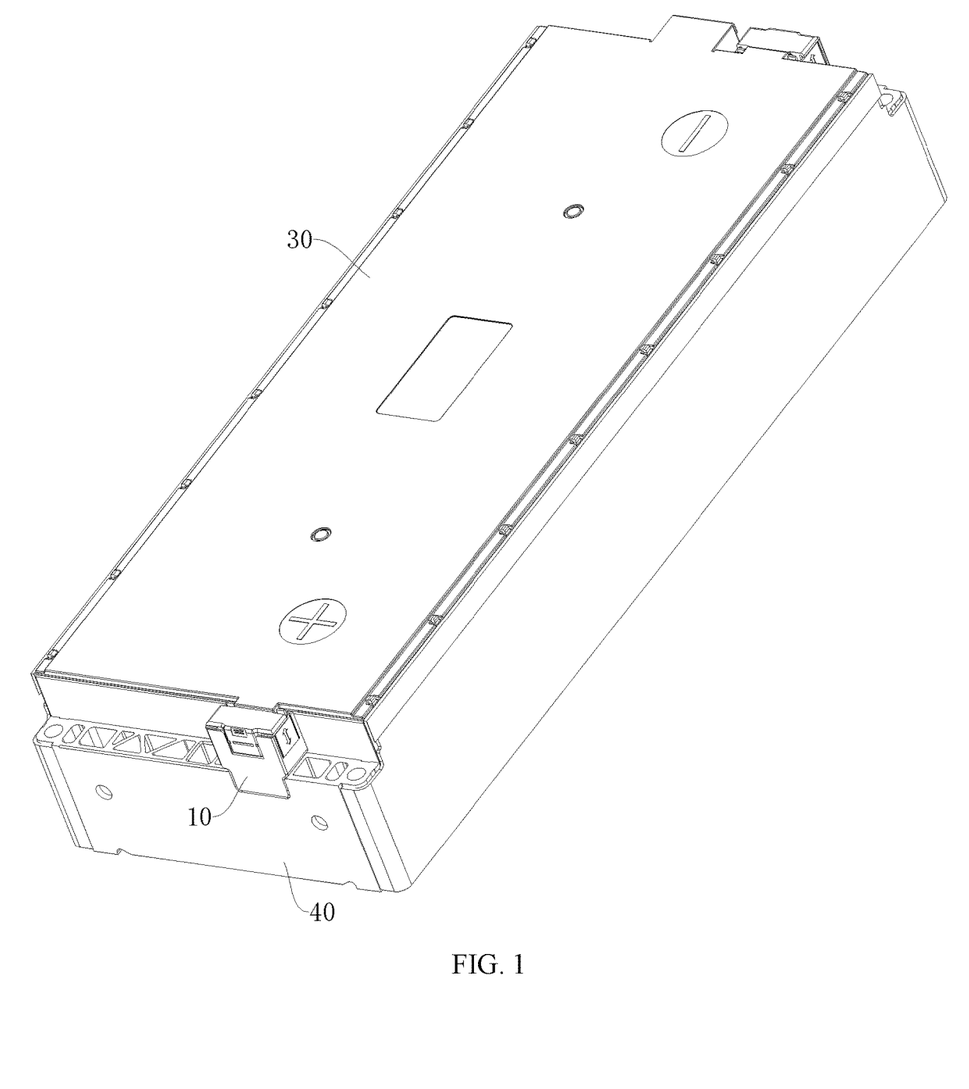
FIG. 1 is a schematic structural diagram of a battery module according to an embodiment of the present application.
Figure 2:
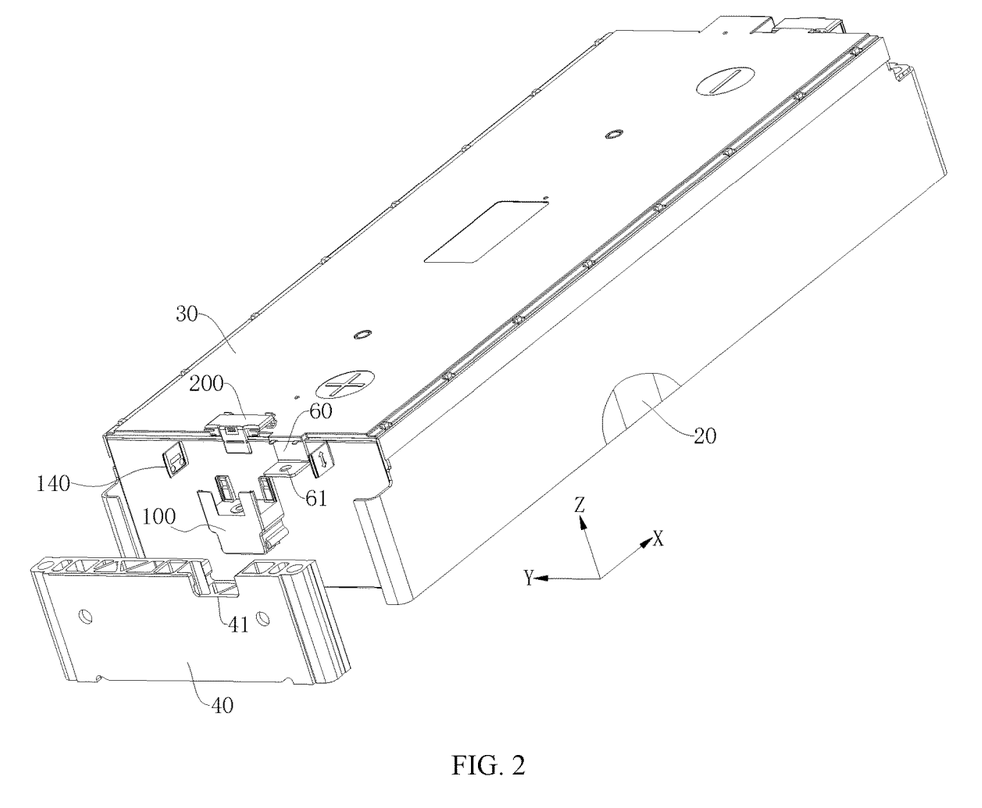
FIG. 2 is a schematic diagram of the exploded structure of FIG. 1.

FIG. 1 is a diagram of an assembled battery module provided by an embodiment of the present application, and FIG. 2 is an explosive schematic diagram of the configuration of FIG. 1. The battery module includes: multiple unit cells 20 stacked in a first direction (X direction in FIG. 2); an output terminal 60, electrically connected to the unit cells 20; an end plate 40, disposed on one side of the multiple unit cells 20 in the first direction and provided with a groove 41, which corresponds to the output terminal 60 in position; and a terminal protection device 10 snapped into the groove 41 and provided with an input port 121 through which the output terminal 60 can extend into the terminal protection device 10.

The configuration of the battery module is not limited to above. For example, the battery module may further include an upper cover 30 disposed on one side of the multiple unit cells 20 in a third direction (Z direction in FIG. 1), the output terminal 60 extends out between the upper cover 30 and the unit cells 20, and the groove 41 is located on a side of the end plate 40 facing the upper cover 30, so that the terminal protection device 10 can correspond to the output terminal 60 in position when snapped into the groove 41.

In the battery module according to the embodiments of the present application, the output terminal 60 of the battery module extends into the terminal protection device 10 and is protected by the terminal protection device 10, and thus safety hazards caused by the exposure of the output terminal 60 can be prevented.

Figure 3:
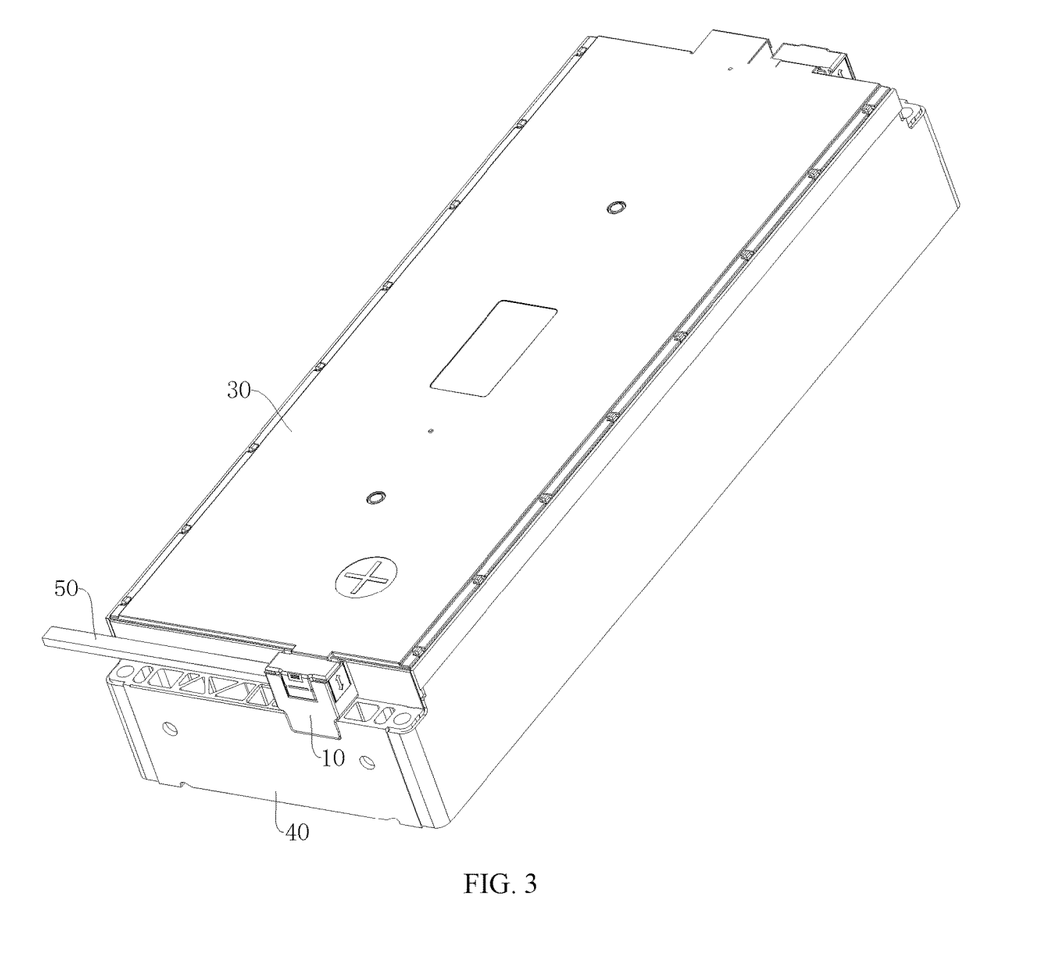
FIG. 3 is a schematic structural diagram of a battery module according to another embodiment of the present application.

Combing with FIG. 3, when multiple battery modules are connected to each other, an electrical connector 50 for connecting the multiple battery modules can extend into the terminal protection device 10 and be connected to the output terminal 60 within the terminal protection device 10, thereby achieving the interconnection between the battery modules.

Figure 4:
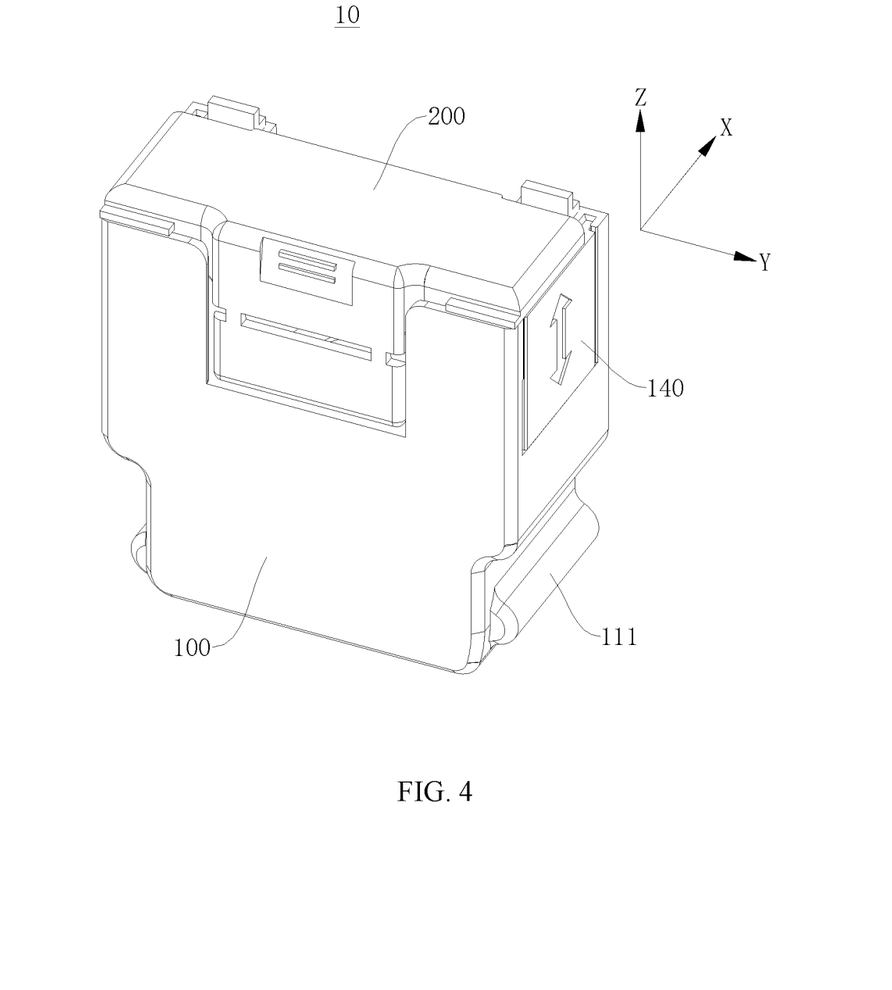
FIG. 4 is a schematic structural diagram of a terminal protection device according to an embodiment of the present application.
Figure 5:
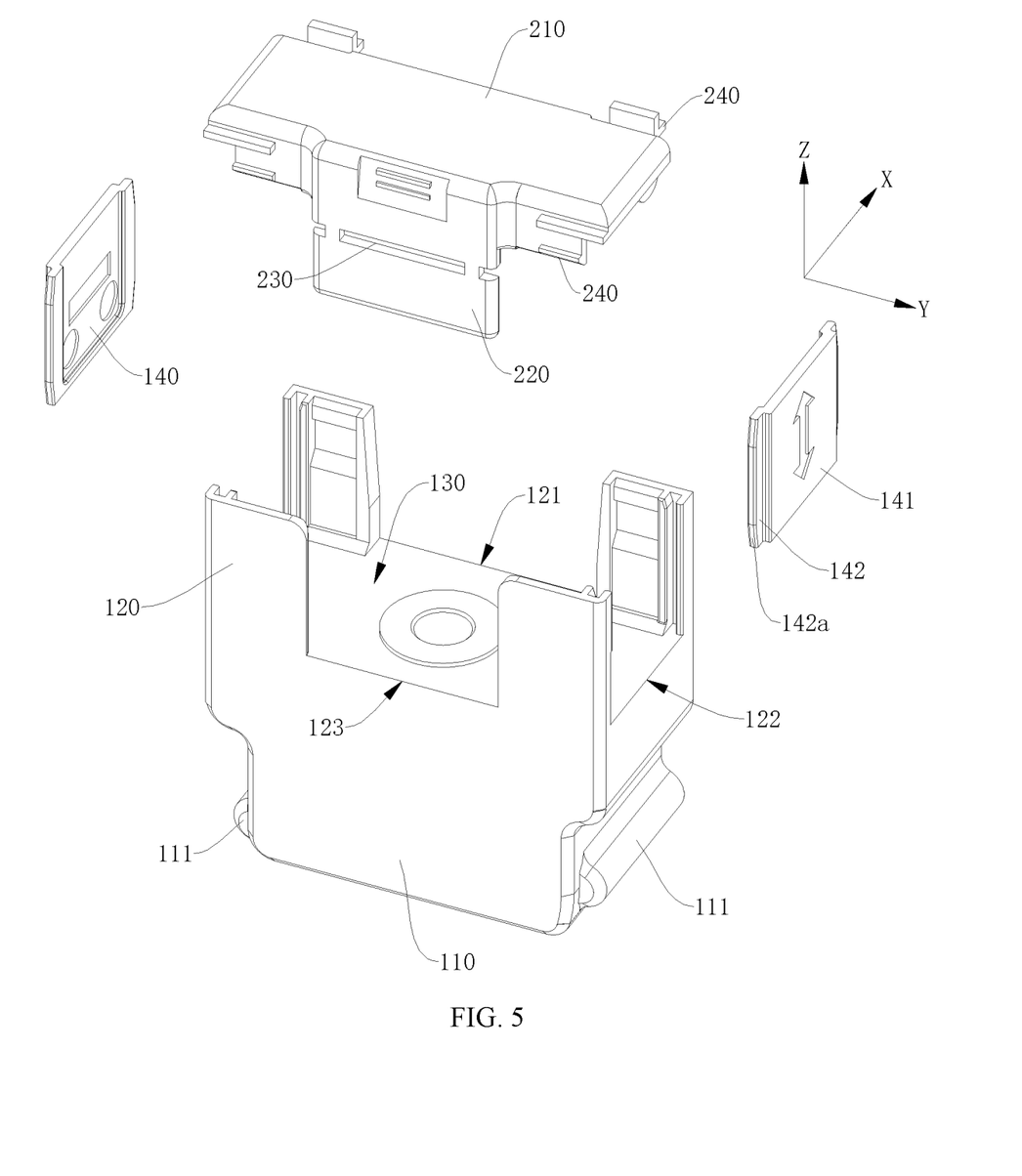
FIG. 5 is a schematic diagram of the exploded structure of FIG. 4.

The terminal protection device 10 can be configured in various manners. As shown in FIGS. 4 and 5, the terminal protection device 10 includes a base 100, the base 100 includes a bottom portion 110 and a side plate 120 connected to a peripheral side of the bottom portion 110, the side plate 120 form a receiving cavity 130 together with the bottom portion 110 and is provided with an input port 121, through which the output terminal 60 passes, that is, the input port 121 for passing of the output terminal 60 is provided on the side plate 120.

Figure 6:
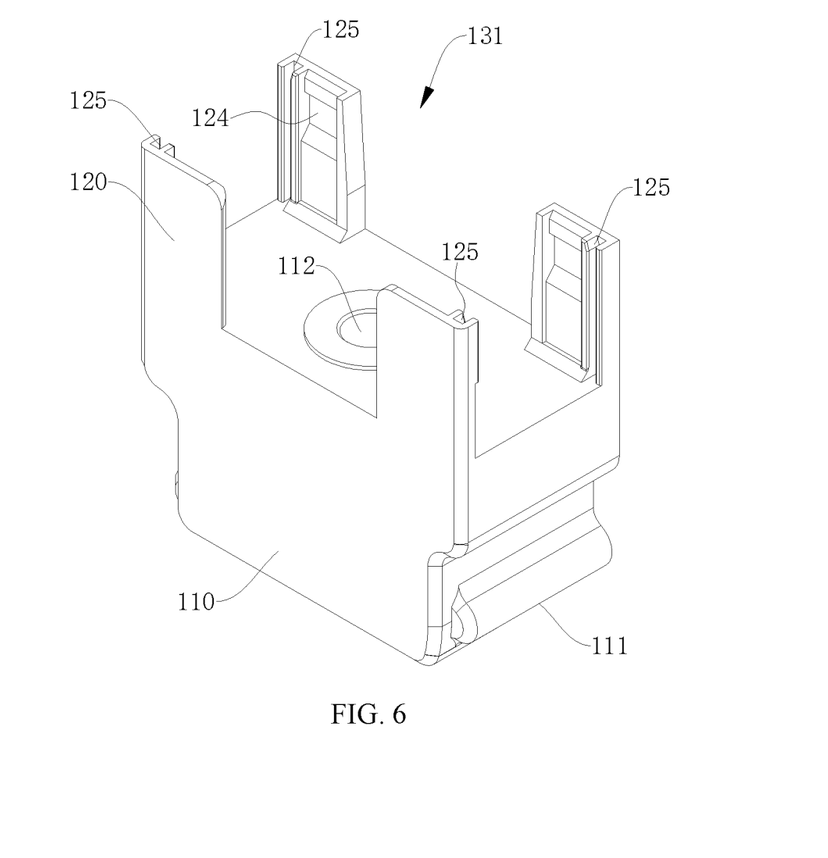
FIG. 6 is a schematic structural diagram of a base of a terminal protection device according to an embodiment of the present application.

Combining with FIG. 6, in order to improve the stability of the relative position between the output terminal 60 and the terminal protection device 10, the output terminal 60 is provided with a through hole 61, the bottom portion 110 is provided with a conductive fastener 112, such as a conductive nut, and by means of a connecting member passing through the through hole 61 and being electrically connected with the conductive fastener 112, the output terminal 60 is fixed to the bottom portion 110.

In order to improve the stability of the relative position between the terminal protection device 10 and the end plate 40, the bottom portion 110 of the base 100 is formed as extending in a third direction (Z direction in FIG. 2), and is provided with a boss 111 on at least one side in a second direction (Y direction in FIG. 2), so that the terminal protection device 10 can be interference fit with the groove 41 of the end plate 40 by means of the boss 111, thereby improving the stability of the relative position between the terminal protection device 10 and the end plate 40. In some optional embodiments, the bottom portion 110 of the base 100 is provided with bosses 111 on both of the opposite sides in the second direction, so that the base 100 receives more uniform force, and meanwhile, the stability of the relative position between the terminal protection device 10 and the end plate 40 can be further ensured.

Further, the side plate 120 is provided with an access port 122, so that the external electrical connector 50 can pass through the access port 122 and be connected to the output terminal 60 in the receiving cavity 130.

The side plate 120 can be configured in various manners. For example, the side plate 120 is not provided with a shield at the access port 122, and when multiple battery modules are connected to each other, the electrical connector 50 directly passes through the access port 122 and is connected to the output terminal 60 in the receiving cavity 130.

In some optional embodiments, a protection plate 140 is disposed at the access port 122, and the protection plate 140 is disposed to detachably cover the access port 122. In these optional embodiments, when multiple battery modules do not need to be connected to each other, for example, during transportation of the battery modules, the protection plate 140 covers the access port 122 so as to prevent the output terminal 60 in the receiving cavity 130 from being electrically connected with external devices and thus prevent occurrence of electric leakage, thereby improving the safety performance of the battery modules during transportation. When the battery modules need to be connected to each other, the protection plate 140 is removed from the access port 122 so that the external electrical connector 50 can pass through the access port 122 and be connected to the output terminal 60.

The protection plate 140 being disposed to detachably cover the access port 122 means the protection plate 140 and the side plate 120 being connected such that the protection plate 140 or the side plate 120 will not be damaged during the removal process of the protection plate 140, and for example, the protection plate 140 is connected to the access port 122 in a snap fit manner. Since the protection plate 140 is detachably disposed at the access port 122, and other parts of the terminal protection device 10 will not be structurally damaged when removing the protection plate 140, the service life of the terminal protection device 10 can be improved, damage of the terminal protection device 10 and thus the resulting exposure of the conductive parts of the output terminal 60 or of the electrical connector 50 can be prevented, and thus the safety performance of the battery module can be improved.

Figure 7:
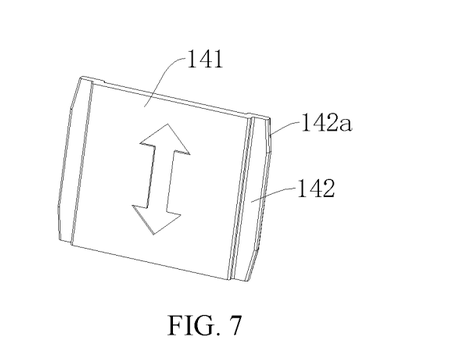
FIG. 7 is a schematic structural diagram of a protection plate of a terminal protection device according to an embodiment of the present application.
Figure 8:
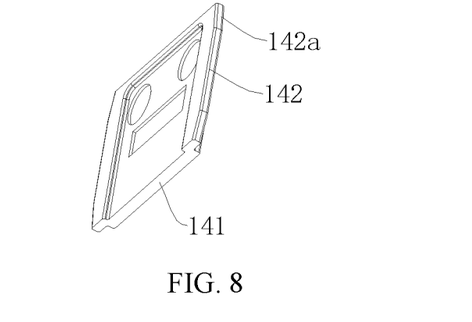
FIG. 8 is a schematic structural diagram of the protection plate of the terminal protection device according to an embodiment of the present application viewed from another direction.
Figure 9:
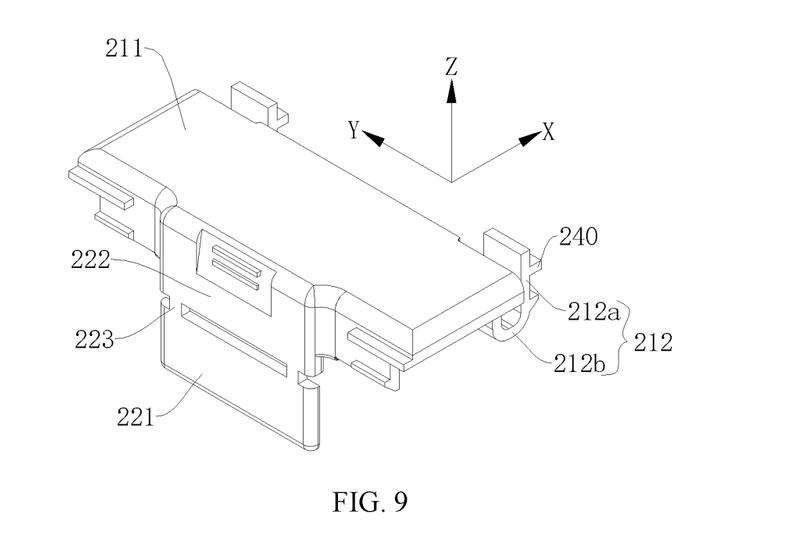
FIG. 9 is a schematic structural diagram of a top cover of a terminal protection device according to an embodiment of the present application.
Figure 10:
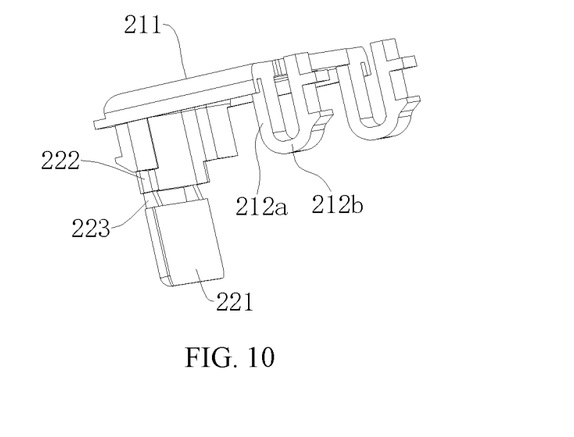
FIG. 10 is a schematic structural diagram of the top cover of the terminal protection device according to an embodiment of the present application viewed from another direction.
Figure 11:
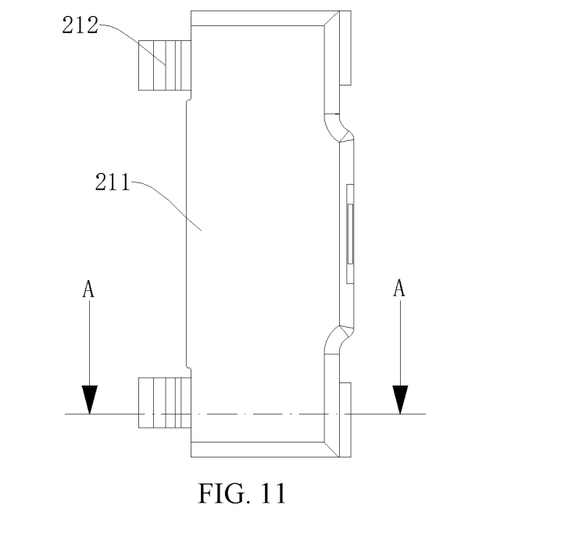
FIG. 11 is a top view of FIG. 9.
Figure 12:
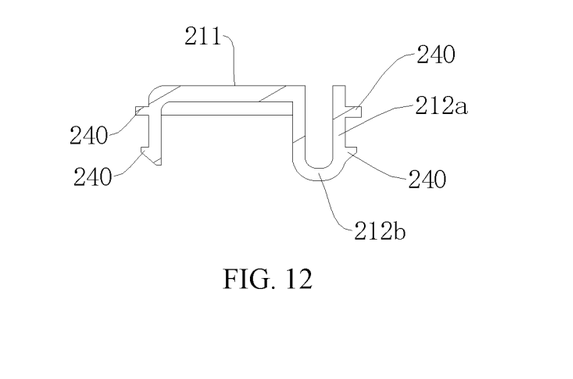
FIG. 12 is a cross-sectional view taken from Line A-A in FIG. 9.

Combining with FIGS. 7-8, the protection plate 140 and the connection port 122 may be detachably connected in various manners. In some optional embodiments, the side plate 120 includes sliding slots 125 extending in the third direction on inner wall surfaces facing the access port 122, the protection plate 140 includes a body portion 141 and sliding plates 142 located at two opposite edges of the body portion 141, and the sliding plates 142 are configured to be movable relative to the sliding slots 125, so that the protection plate 140 can be detachably disposed in the sliding slots 125 through the sliding plates 142.

In these alternative embodiments, the detachable connection between the protection plate 140 and the side plate 120 is realized by moving the sliding plates 142 relative to the sliding slots 125. The sliding plates 142 are configured to be movable relative to the sliding slots 125. When the output terminal 60 does not need to be connected to the electrical connector 50, the protection plate 140 is limited in the sliding slots 125 through the sliding plates 142; and when the output terminal 60 needs to be connected to the electrical connector 50, the protection plate 140 is slid out of the sliding slots 125 through the sliding plates 142, thereby completing the removal of the protection plate 140. Further, during the removal process of the protection plate 140, the side plate 120 or the protection plate 140 will not be structurally damaged, and the operation is simple and convenient.

In some optional embodiments, the configuration of the protection plate 140 is not limited to above. The sliding plate 142 includes two ends opposite in the third direction and a middle portion between the two ends, and the sliding plate 142 has a dimension in the first direction which increases from at least one end to the middle portion.

In these optional embodiments, the dimension of the sliding plate 142 increases in the direction from the end to the middle portion, and thus the middle portion has a dimension larger than that of the end; thus, when the sliding plate 142 enters the sliding slot 125 through its end, this facilitates the mutual alignment of the sliding plate 142 with the sliding slot 125, and the assembly speed of the terminal protection device 10 can be improved.

The protection plate 140 may be configured in various manners so as to have an increasing dimension. For example, at least one of the two ends is provided with a guide surface 142a, and the guide surface is inclined toward the body portion 141 in a direction from the middle portion to the end.

As shown in FIGS. 7 and 8, both of the two opposite ends of the slide plate 142 are provided with the guide surfaces 142a, and both of the two opposite ends of the both slide plates 142 on the two edges of the body portion are provided with the guide surfaces 142a; thus, the protection plate 140 includes four guide surfaces 142a. During the assembling process of the protection plate 140, the protection plate 140 can be slid into the sliding slots 125 through either one of the ends in the third direction, and thus the assembly speed of the terminal protection device 10 can be further improved.

The number of the access ports 122 is not limited here. In some optional embodiments, there are at least two access ports 122, the at least two access ports 122 are spaced apart in a circumferential direction of the side plate 120, and at each access port 122, a corresponding protection plate 140 disposed.

In these optional embodiments, there are at least two access ports 122, and the at least two access ports 122 are located at different positions of the side plate 120, respectively. When connecting multiple battery modules, it is convenient for the electrical connector 50 to extend into the receiving cavity 130 from different positions of the side plate 120, and the access port 122, through which the electrical connector 50 extends into the receiving cavity 130 with the shortest extending path, can be selected; thus, the material of the electrical connector 50 can be saved, the structure of the electrical connector 50 can be simplified, and the space occupied by the electrical connector 50 can be reduced.

Further, the at least two access ports 122 and the input port 121 are spaced apart in the circumferential direction of the side plate 120, and the input port 121 is located on a side of the side plate 120 facing the output terminal 60, so that the output terminal 60 can extend into the receiving cavity 130 with a shorter extending distance, while optimizing the distribution of the access ports 122 and the input port 121, and reducing the volume of the side plate 120.

Combining with FIGS. 9 to 12, in some optional embodiments, the receiving cavity 130 further includes an opening 131 disposed opposite to the bottom portion 110, the opening 131 is in communication with the access port 122 and is covered by a top cover 200, and the top cover 200 is detachably disposed at the opening 131, so that the protection plate 140 is limited at the access port 122 by the top cover 200.

In these optional embodiments, the top cover 200 is provided at the opening 131 of the receiving cavity 130, the receiving cavity 130 is in communication with the access port 122, and thus the protection plate 140 can be limited at the access port 122 by the top cover 200. When multiple battery modules do not need to be connected to each other, the top cover 200 is disposed to cover the opening 131, so that the protection plate 140 is limited at the access port 122 by the top cover 200, to ensure the stability of the relative position between the protection plate 140 and the side plate 120, and the safety performance of the battery module during transportation. When multiple battery modules need to be connected to each other, the top cover 200 is removed from the opening 131, so that the protection plate 140 can be removed through the opening 131 and thus the multiple battery modules can be connected to each other.

The protection plate 140 can be limited at the access port 122 by the top cover 200 in various manners. In some optional embodiments, when the protection plate 140 is movably disposed in the sliding slots 125 on the side plate 120 through the sliding plates 142, the access port 122 is in communication with the opening 131, and the sliding slots 125 extend to the opening 131. When the output terminal 60 does not need to be connected to the electrical connector 50, the protection plate 140 can be slid from the opening 131 into the sliding slots 125, and then the top cover 200 is disposed to cover the opening 131, so as to prevent the protection plate 140 from falling off through the opening 131. When the output terminal 60 needs to be connected to the electrical connector 50, the top cover 200 is removed from the opening 131, so that the protection plate 140 can be slid out of the sliding slots 125 through the opening 131 to complete the removal of the protection plate 140.

In some other optional embodiments, when the protection plate 140 is detachably disposed at the access port 122 by other means, the protection plate 140 can be limited in position in the third direction by the top cover 200 placed at the opening 131, and thus can be limited at the access port 122.

The configurations of the side plate 120 and the top cover 200 are not limited to above. In some optional embodiments, the side plate 120 further includes a connection port 123 spaced apart from the access port 122 in the circumferential direction of the side plate 120; the top cover 200 includes a cover plate 210 and a shielding plate 220 extending out from the cover plate 210, the cover plate 210 covers the opening 131, and the shielding plate 220 correspondingly shields the connection port 123; the shielding plate 220 is provided with a notch 230 extending in the second direction, through which at least a part of the shielding plate 220 on a side of the notch 230 away from the cover plate 210 can be removed so that the external electrical connector 50 can pass through the connection port 123 and be connected to the output terminal 60.

In these optional embodiments, the side plate 120 is further provided with the connection port 123 so that the electrical connector 50 can be connected to the output terminal 60 through any one of the connection port 123 and the access ports 122. The top cover 200 is provided with the shielding plate 220, which extends from the top cover 200, can shield the connection port 123, and is provided with the notch 230 through which at least part of the shielding plate 220 can be removed, thereby opening the connection port 123. By providing the connection port 123, the number of connection positions for the electrical connector 50 on the terminal protection device 10 is further increased, so that the electrical connector 50 can be connected to the output terminal 60 in the receiving cavity 130 from different directions and different positions.

When multiple battery modules do not need to be connected to each other, the shielding plate 220 can shield the connection port 123, and improve the safety performance of the multiple battery modules during transportation; when multiple battery modules are connected to each other and the electrical connector 50 needs to be connected to the output terminal 60 through the connection port 123, part of the shielding plate 220 can be removed, so that the electrical connector 50 can extend into the receiving cavity 130 through the connection port 123 and be connected to the output terminal 60.

Figure 13:
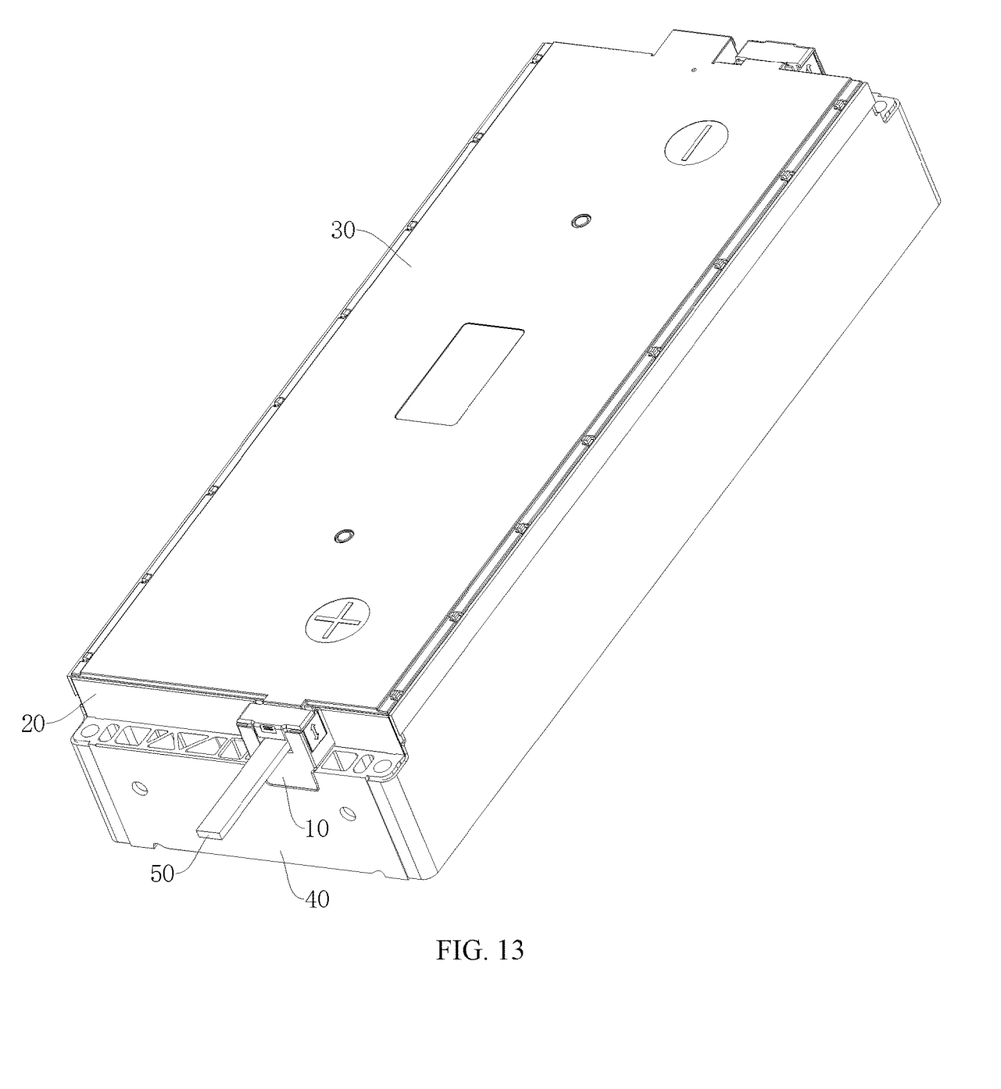
FIG. 13 is a schematic structural diagram of a battery module according to another embodiment of the present application.
Figure 14:
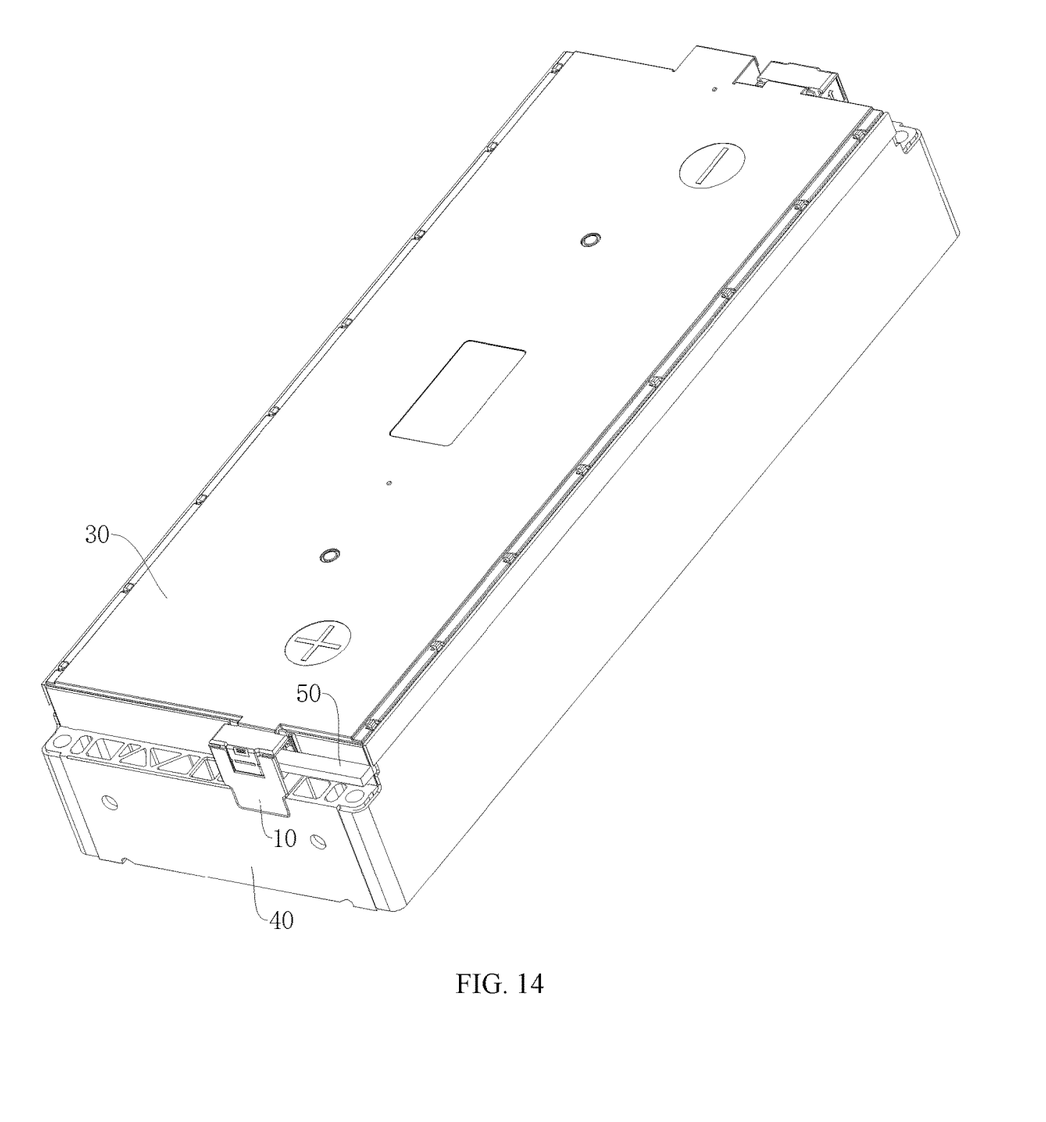
FIG. 14 is a schematic structural diagram of a battery module according to still another embodiment of the present application.

The shape of the side plate 120 is not limited here; for example, the side plate 120 is roughly in a shape of a quadrangular prism, the connection port 123 and the input port 121 are disposed on the side plate 120 oppositely to each other in the first direction, two access ports 122 are disposed on the side plate 120 oppositely to each other in the second direction. In such manner, the two access ports 122 and one connection port 123 are provided at different positions of the side plate 120 and toward different directions respectively. As shown in FIG. 3, FIG. 13 and FIG. 14, the electrical connector 50 can be connected to the output terminal 60 in three different directions, respectively.

It shall be understood that, in the above-mentioned embodiment, at least part of the shielding plate 220 can be removed through the notch 230 in various manners; in some optional embodiments, the shielding plate 220 includes a removable portion 221, a connecting portion 222, and a corner portion 223 for connecting the removable portion 221 and the connecting portion 222, the removable portion 221, the corner portion 223 and the connecting portion 222 being successively distributed in the third direction, wherein the removable portion 221 is located on a side of the notch 230 away from the cover plate 210, the connecting portion 222 is located between the notch 230 and the cover plate 210, and the third direction intersects with the second direction; and the corner portion 223 has a cross section with a dimension decreasing in a direction from the removable portion 221 to the connection portion 222.

In these optional embodiments, the removable portion 221 can be pulled off from the connecting portion 222 by means of the notch 230 and the corner portion 223, so that the connection port 123 is opened. Since the cross section of the corner portion 223 has a dimension decreasing in the direction from the removable portion 221 to the connecting portion 222, when the shielding plate 220 is forced to remove the removable portion 221, the portion of the corner portion 223 close to the connecting portion 222 is easier to be broken and thus the corner portion 223 tends to not be left on the end surface of the connecting portion 222, thereby improving the flatness of the end surface of the connecting portion 222, which can reduce the friction loss of the electrical connector 50 caused by the connecting portion 222 when the electrical connector 50 extends through the connection port 123, and thus increase the service life of the electrical connector 50.

The cross section of the corner portion 223 may refer to a first plane of the corner portion 223 taken along X-Y plane, or a second plane of the corner portion 223 taken along X-Z plane. In some optional embodiments, the cross section of the corner portion 223 refers to both of the first plane and the second plane, thereby further ensuring the flatness of the end surface of the connecting portion 222 after the removable portion 221 is pulled off.

In any of the above embodiments, the top cover 200 can be detachably disposed at the opening 131 in various manners. For example, one of the top cover 200 and the side plate 120 is provided with a first snap member, the other one is provided with a second snap member fitted with the first snap member, and the top cover 200 and the side plate 120 are connected to each other in a snap fit manner by the first snap member and the second snap member.

The configurations of the first snap member and the second snap member are not limited herein. For example, the first snap member is formed as a groove 124, and the second snap member is formed as a protrusion 240; in case that the second snap member is formed as the protrusion 240, two protrusions 240 are provided, so that one of the two protrusions 240 is snapped into the groove 124 while the second protrusion 240 is stopped on a top of the side plate 120 or a top of the top cover 200.

As shown in FIG. 6, two inner surfaces of the side plate 120 opposite to each other in the first direction are both provided with the grooves 124, and two outer surfaces of the top cover 200 opposite to each other in the first direction are each provided with two protrusions 240 spaced apart in the third direction, so that one of the two protrusions 240 is snapped into the groove 124 and the other protrusion 240 is stopped on the top of the side plate 120.

In these optional embodiments, the two inner surfaces of the side plate 120 are provided with the grooves 124, the two outer surfaces of the top cover 200 corresponding to the two inner surfaces of the side plate 120 are each provided with two protrusions 240, and the protrusions 240 correspond to the grooves 124, so that the side plate 120 and the top cover 200 are connected to each other in a snap fit manner by means of the grooves 124, the protrusions 240 and the elasticity of the materials of the side plate 120 and the top cover 200. Each outer surface is provided with two protrusions 240, one of the protrusions 240 is snapped into the groove 124, the other protrusion 240 is stopped at the top of the side plate 120, and thus the stability of the relative position between the top cover 200 and the side plate 120 can be improved.

In the case that the top cover 200 is provided with two protrusions 240 spaced apart in the third direction, the protrusion 240 on a side of the top cover 200 close to the side plate 120 is provided with a guide surface, so that the protrusion 240 has a dimension decreasing toward the side plate 120, which facilitates the protrusion 240 to be snapped into the groove 124 through the guide surface.

It shall be understood that the positions of the protrusions 240 and the grooves 124 are not limited to above. For example, two protrusions 240 may be provided on each of the two inner surfaces of the side plate 120 opposite to each other in the first direction, the grooves 124 may be provided on both of the two outer surfaces of the top cover 200 opposite to each other in the first direction, and one of the two protrusions 240 is snapped into the groove 124, and the other protrusion 240 is stopped on the top of the top cover 200.

Further, when the top cover 200 and the side plate 120 are connected to each other in the snap fit manner by the first snap member and the second snap member, in order to improve the elastic deformation of the top cover 200 in the first direction, the cover plate 210 of the top cover 200 includes a flat portion 211 and a resilient portion 212 connected to each other in the first direction, wherein the resilient portion 212 is U-shaped, and includes two side arms 212a spaced apart in the first direction, and a connecting arm 212b connected between the two side arms 212a.

In these alternative embodiments, when snapping the top cover 200 onto the side plate 120, the deformation of the side arms 212a can increase the deformation amount of the top cover 200 in the first direction, thereby preventing the damage of the top cover 200 or of the side plate 120 when snapping the top cover 200 onto the side plate 120 or separating the top cover 200 from the side plate 120, and thus increasing the service life of the top cover 200 and the side plate 120.

The number and configuration of the flat portion 211 and that of the resilient portion 212 are not limited here. For example, there may be two flat portions 211, and the two flat portions 211 are respectively disposed on two sides of the resilient portion 212 in the second direction, and are respectively connected to the resilient portion 212 through the side arm 212a.

In some optional embodiments, in order to simplify the forming method of the top cover 200, the cover plate 210 includes a flat portion 211 and a resilient portion 212 that are successively distributed in the first direction, and the resilient portion 212 is connected to the flat portion 211 through one of the side arms 212a.

When the top cover 200 is provided with two protrusions 240 on each of the two outer surfaces opposite to each other in the first direction, the flat portion 211 is provided with a side portion extending toward the base 100 on a side away from the resilient portion 212, and the two protrusions 240 are provided on an outer surface of the side portion; and one of the side arms 212a of the resilient portion 212 is connected to the flat portion 211, and the other side arm 212a is provided with two protrusions 240 on an outer surface thereof.

The number of resilient portions 212 is not limited here, and there may be at least one resilient portions 212. When there are more than two resilient portions 212, the more than two resilient portions 212 are spaced apart in the second direction, one of the side arms 212a of each resilient portion 212 is connected to the flat portion 211, and the other side arm 212a of each resilient portion 212 is provided with two protrusions 240 on the outer surface.

It shall be understood that the configuration of the top cover 200 is not limited to above. For example, when the groove 124 is provided on the top cover 200, the outer surface of the side portion of the flat portion 211 on the side away from the resilient portion 212 is provided with the groove 124, and the side arm 212a of the resilient portion 212 away from the flat portion 211 is also provided with the groove 124 on the outer surface.

The present application can be implemented in other specific forms without departing from its spirit and essential characteristics. For example, the algorithm described in the specific embodiment can be modified, and the system architecture does not deviate from the basic spirit of the application. Therefore, the current embodiments are regarded as illustrative rather than restrictive in all aspects, and the scope of the present application is defined by the appended claims rather than the foregoing description, and all the modifications falling within the meaning and equivalents of the claims are included in the scope of the present application.

What is claimed is:

1. A terminal protection device for a battery module, comprising:
    a base, comprising a bottom portion and a side plate connected to a peripheral side of the bottom portion, the side plate defining a receiving cavity together with the bottom portion and being provided with an input port through which an output terminal passes, and the input port being in communication with the receiving cavity,
    wherein the side plate is provided with an access port, the access port is in communication with the receiving cavity so that an external electrical connector is able to pass through the access port and be connected with the output terminal, and the protection plate is disposed to detachably cover the access port,
    wherein the terminal protection device further comprises a top cover for covering an opening of the receiving cavity, the opening is disposed oppositely to the bottom portion and in communication with the access port, the protection plate is disposed within the access port of the side plate, is separately formed from the top cover, and is configured to be slidably movable with respect to the side plate.

2. The terminal protection device according to claim 1, wherein the side plate is provided with at least two access ports spaced apart in a circumferential direction of the side plate, and a corresponding protection plate is disposed within each of the access ports.

3. The terminal protection device according to claim 1, wherein the top cover is detachably disposed at the opening so as to limit the protection plate within the access port.

4. The terminal protection device according to claim 3, wherein:
    the side plate further comprises a connection port spaced apart from the access port in the circumferential direction of the side plate;
    the top cover comprises a cover plate and a shielding plate extending out from the cover plate, the cover plate covers the opening and the shielding plate shields the connection port correspondingly; and
    the shielding plate is provided with a notch extending in a second direction, so that at least a part of the shielding plate on a side of the notch away from the cover plate can be removed by means of the notch, and the external electrical connector can pass through the connection port and be connected with the output terminal.

5. The terminal protection device according to claim 4, wherein:

the shielding plate comprises a removable portion, a connecting portion and a corner portion connecting the removable portion and the connecting portion, the removable portion, the corner portion and the connecting portion are successively distributed in a third direction, the removable portion is located at the side of the notch away from the cover plate, the connecting portion is located between the notch and the cover plate, and the third direction intersects with the second direction; and the corner portion has a cross section with a dimension decreasing in a direction from the removable portion to the connecting portion.

6. The terminal protection device according to claim 3, wherein one of the top cover and the side plate is provided with a first snap member, and the other is provided with a second snap member, the second snap member is fitted with the first snap member so that the top cover and the side plate is connected to each other in a snap fit manner by means of the first snap member and the second snap member.

7. The terminal protection device according to claim 6, wherein the first snap member is formed as a groove, and the second snap member is formed as a protrusion; the second snap member comprises two protrusions spaced apart in the third direction, one of the two protrusions is snapped into the groove, and the other one is stopped on a top of the side plate or a top of the top cover.

8. The terminal protection device according to claim 4, wherein the cover plate comprises a flat portion and a resilient portion connected to each other in the first direction, the resilient portion is U-shaped, and comprises two side arms spaced apart in the first direction, and a bottom arm connected between the side arms.

9. The terminal protection device according to claim 1, wherein:
the side plate comprises sliding slots extending in a third direction on inner surfaces facing the access port; and
the protection plate comprises a body portion and sliding plates located on two opposite edges of the body portion, and the sliding plates are movable relative to the sliding slots, so that the protection plate is detachably disposed in the sliding slots through the sliding plates.

10. The terminal protection device according to claim 9, wherein the sliding plates each comprises two ends opposite to each other in the third direction and a middle portion located between the two ends, and has a dimension in a first direction increasing from at least one of the ends to the middle portion.

11. The terminal protection device according to claim 1, wherein the bottom portion is formed as extending in a third direction, and the bottom portion is provided with a boss on at least one side in a second direction, so that the terminal protection device is snapped into an end plate of the battery module through the boss.

12. A battery module, comprising:
multiple unit cells, stacked in a first direction;
an output terminal, electrically connected to the unit cells;
an end plate, disposed on one side of the multiple unit cells in the first direction and provided with a groove, the groove corresponding to the output terminal in position; and
the terminal protection device according to claim 1 snapped into the groove, and at least part of the output terminal extending into the receiving cavity of the terminal protection deceive through the input port.

13. The battery module according to claim 12, wherein the side plate is provided with at least two access ports spaced apart in a circumferential direction of the side plate, and a corresponding protection plate is disposed within each of the access ports.

14. The battery module according to claim 12, wherein the top cover is detachably disposed at the opening so as to limit the protection plate within the access port.

15. The battery module according to claim 14, wherein:
the side plate further comprises a connection port spaced apart from the access port in the circumferential direction of the side plate;
the top cover comprises a cover plate and a shielding plate extending out from the cover plate, the cover plate covers the opening and the shielding plate shields the connection port correspondingly; and
the shielding plate is provided with a notch extending in a second direction, so that at least a part of the shielding plate on a side of the notch away from the cover plate can be removed by means of the notch, and the external electrical connector can pass through the connection port and be connected with the output terminal.

16. The battery module according to claim 15, wherein:
The shielding plate comprises a removable portion, a connecting portion and a corner portion connecting the removable portion and the connecting portion, the removable portion, the corner portion and the connecting portion are successively distributed in a third direction, the removable portion is located at the side of the notch away from the cover plate, the connecting portion is located between the notch and the cover plate, and the third direction intersects with the second direction; and the corner portion has a cross section with a dimension decreasing in a direction from the removable portion to the connecting portion.

17. The battery module according to claim 14, wherein one of the top cover and the side plate is provided with a first snap member, and the other is provided with a second snap member, the second snap member is fitted with the first snap member so that the top cover and the side plate is connected to each other in a snap fit manner by means of the first snap member and the second snap member.

18. The battery module according to claim 17, wherein the first snap member is formed as a groove, and the second snap member is formed as a protrusion; the second snap member comprises two protrusions spaced apart in the third direction, one of the two protrusions is snapped into the groove, and the other one is stopped on a top of the side plate or a top of the top cover.

19. The battery module according to claim 15, wherein the cover plate comprises a flat portion and a resilient portion connected to each other in the first direction, the resilient portion is U-shaped, and comprises two side arms spaced apart in the first direction, and a bottom arm connected between the side arms.

20. The battery module according to claim 12, wherein:
the side plate comprises sliding slots extending in a third direction on inner surfaces facing the access port; and
the protection plate comprises a body portion and sliding plates located on two opposite edges of the body portion, and the sliding plates are movable relative to the sliding slots, so that the protection plate is detachably disposed in the sliding slots through the sliding plates.

* * * * *